United States Patent
Carrera

(10) Patent No.: US 6,473,494 B1
(45) Date of Patent: Oct. 29, 2002

(54) TELEPHONY SYSTEM FORMED BY A BASE STATION AND AT LEAST ONE SUBSCRIBER DEVICE, COMPRISING A CALLBACK SYSTEM, METHOD OF ESTABLISHING CALLBACKS

(75) Inventor: Albert Carrera, Ruaudin (FR)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/249,970

(22) Filed: Feb. 12, 1999

(30) Foreign Application Priority Data

Feb. 17, 1998 (FR) .............................................. 98 01907

(51) Int. Cl.[7] .............................................. H04M 1/64
(52) U.S. Cl. ...................... 379/88.12; 379/67.1; 379/76; 379/88.08; 379/88.11; 379/88.17; 379/88.22
(58) Field of Search .............................. 379/34, 40, 47, 379/51, 56.2, 56.3, 67.1, 69, 76, 82, 88.08, 88.09, 88.11, 88.12, 88.17, 88.22; 455/555, 556, 560

(56) References Cited

U.S. PATENT DOCUMENTS

| | | | | |
|---|---|---|---|---|
| 4,481,382 A | * | 11/1984 | Villa-Real ..................... | 455/556 |
| 5,321,737 A | * | 6/1994 | Patsiokas ...................... | 379/58 |
| 5,465,401 A | * | 11/1995 | Thompson .................... | 455/89 |
| 5,491,739 A | * | 2/1996 | Wadin et al. ................. | 379/57 |
| 5,544,321 A | * | 8/1996 | Theimer et al. ....... | 395/200.11 |
| 5,652,789 A | * | 7/1997 | Miner et al. ................. | 379/201 |
| 5,933,778 A | * | 8/1999 | Buhrmann et al. ......... | 455/461 |
| 6,088,431 A | * | 7/2000 | LaDue ........................ | 379/114 |
| 6,125,281 A | * | 9/2000 | Wells et al. ................. | 455/466 |
| 6,141,562 A | * | 10/2000 | Eriksson ...................... | 455/555 |
| 6,192,255 B1 | * | 2/2001 | Lewis et al. ................. | 455/558 |
| 6,308,062 B1 | * | 10/2001 | Chien et al. ................. | 455/420 |

FOREIGN PATENT DOCUMENTS

| DE | 19625814 A1 | 1/1998 | ............ H04Q/7/26 |
|---|---|---|---|
| EP | 0699009 A1 | 2/1998 | ............ H04Q/7/22 |
| JP | 5276230 A | 10/1993 | ............ H04M/1/00 |

* cited by examiner

Primary Examiner—Allan Hoosain
(74) Attorney, Agent, or Firm—Dicran Halajian

(57) ABSTRACT

A telephony system is formed by a base station and subscriber devices. The telephony system has a callback system for producing callback signals by acting on a sound device, for example, by ringing a sound via the earphone for the users. The callback signals are associated with a message which may be a sound or visualized message.

20 Claims, 4 Drawing Sheets

Figure 1:
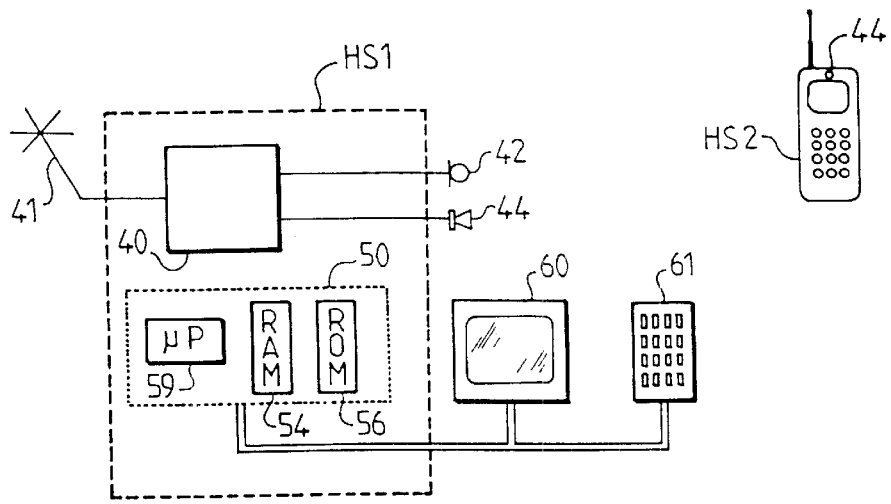
Figure 1:
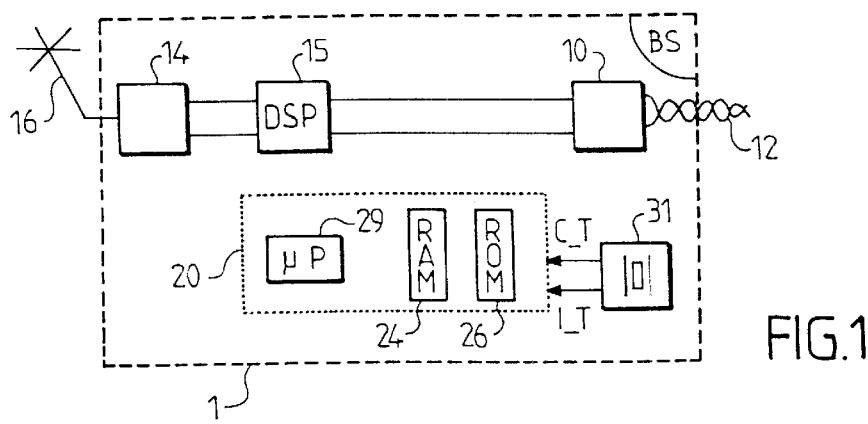

TELEPHONY SYSTEM FORMED BY A BASE STATION AND AT LEAST ONE SUBSCRIBER DEVICE, COMPRISING A CALLBACK SYSTEM, METHOD OF ESTABLISHING CALLBACKS

FIELD OF THE INVENTION

The invention relates to a telephony system formed by a base station and at least one subscriber device intended for at least one user, the telephony system comprising a callback system for producing callback signals for at least one of said users.

The invention relates to a method of establishing callbacks and also a station suitable for such a telephony system.

The invention also relates to a base station suitable for such a telephony system.

The invention further relates to a subscriber device also suitable for such a system.

The invention finds important applications in all the telephony devices called "cordless" telephones. For example, telephony devices notably satisfying the DECT standard.

BACKGROUND OF THE INVENTION

Japanese patent application no. 5-276230/4-101940 describes such a telephony system. This telephony system comprises a callback system which applies a callback signal to the user. This callback function is rather unpolished and does not permit the user to know the reason for this callback signal. This drawback becomes insuperable when this user has provided callbacks for a series of events, for example, ask a first person to call back and go to an appointment etcetera . . . . The result may be that this user is mistaken about a callback signal and mixes up two actions he had programmed.

SUMMARY OF THE INVENTION

For totally remedying this type of drawback, such a callback system cited in the opening paragraph is characterized in that a message receiving means is provided which can be linked with the callback signal.

According to characteristic features of the invention, these messages may be voice and/or visual messages.

These and other aspects of the invention will be apparent from and elucidated with reference to the embodiments described hereinafter.

Figure 2:
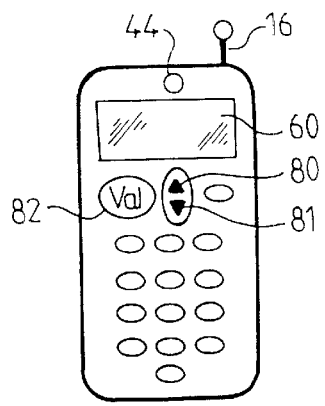
Figure 3:
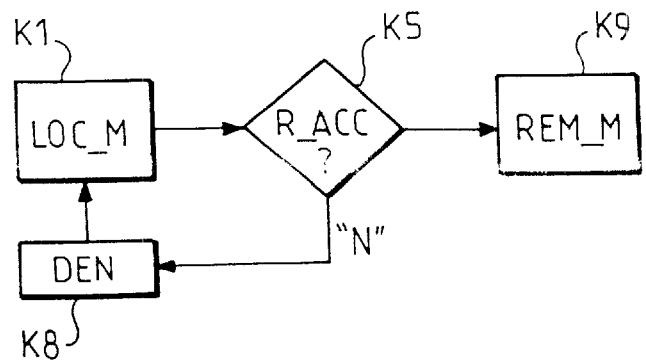
Figure 4:
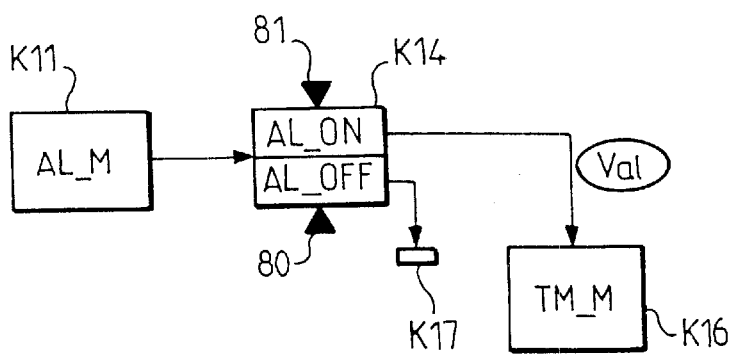
Figure 5:
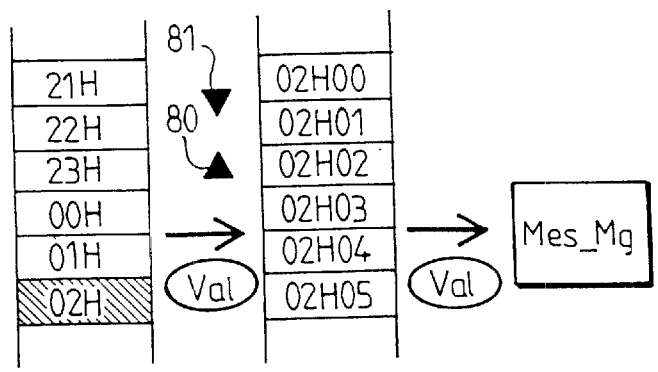
Figure 6:
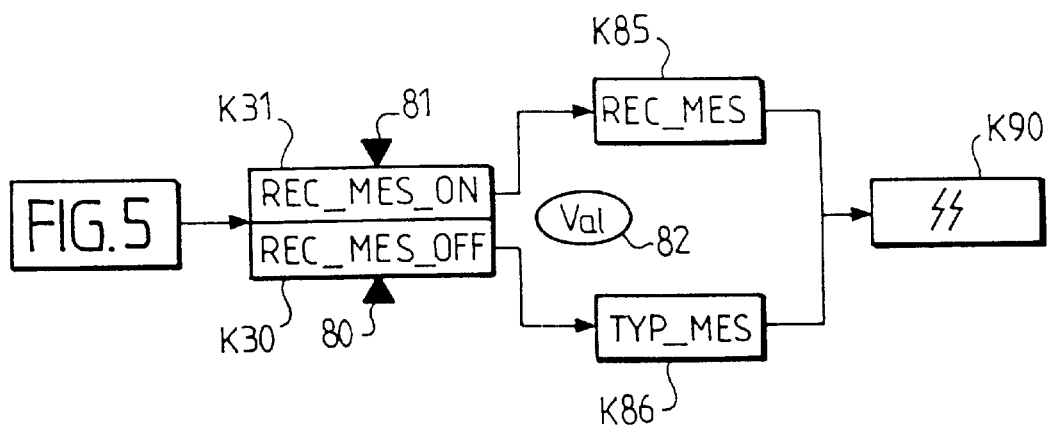
Figure 7:
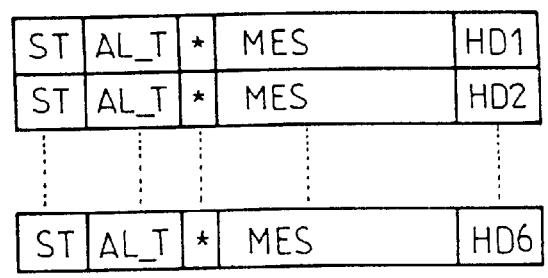

In the drawings:

FIG. 1 shows a telephony system according to the invention,

FIG. 2 shows a subscriber device showing the elements used in the invention, FIG. 3 shows a first flow chart of the operation of the telephony system of FIG. 1, explaining the connection of the subscriber device to the base station, FIG. 4 shows a second flow chart, explaining the process of establishing the callback, FIG. 5 shows how the callback time is established, FIG. 6 shows another flow chart explaining the recording linked with the callback, FIG. 7 shows the structure of a table for establishing said callbacks, and FIG. 8 again shows a flow chart explaining the callback process.

DETAILED DESCRIPTION OF THE INVENTION

In FIG. 1, the system that is represented is a system satisfying the DECT standards. Reference 1 shows the base station BS to which can be connected by radio channel a plurality of handsets HS1, HS2, . . . . This base station 1 comprises, inter alia, a line circuit 10 which makes it possible for the base station to be connected to the switched network by a telephone line 12 and a radio circuit 14 which authorizes the dialogue with the various handsets HS1, HS2, . . . by transmitting and receiving waves via an antenna 16. For processing all the analog type of data which are in transit inside the basic circuit, a signal processing element 15 is provided formed around a signal processor DSP which notably processes voice signals so as to transform them into digital signals.

All the elements of this basic circuit 1 are managed by a microprocessor assembly 20. This element is formed, notably, in the usual manner, by a random access memory 24 (which may be subdivided into a working memory and also into a memory for storing sound messages), a read-only memory 26 containing the operating instructions of the callback system and an administrative processor 29.

A clock 31 applies in the direction of this assembly 20 a first signal C_T giving the time and the day and also a second signal I_T rendered active every minute for triggering actions which will be described below.

The handset HS1 only shown in detail (the handset HS2 may be of identical structure) comprises a communication assembly 40 which has an antenna 41 permitting it to communicate with the base station BS and from there with the other handsets HS2, . . . . This assembly processes the data coming from the microphone 42 and also produces the signals for an earphone 44. Also a management element 50 is provided formed just like the management element 20, by a random access memory 54, a read-only memory 56 containing the operating instructions of the callback system and an administrative processor 59. The memory 56 may be an EEPROM memory or a flash memory. The handset HS1 also includes a display 60 on which several data are displayed and a keyboard 61. These handsets are mobiles and for this reason supplied with power by an accumulator (not shown in FIG. 1). On display 60 may appear menus whose appearance is triggered by the user by means of keys of the keyboard 61.

FIG. 2 shows the front of a handset. In this Figure are shown two references 80 and 81 for marking out the keys on which are shown an arrow pointing up and an arrow pointing down, respectively. These keys 80 and 81 make it possible to scroll the fields of the menu which appear on the display 60. The fields of the menus may be validated by depressing a validation key 82.

The telephony system of FIG. 1 has a callback system for triggering a callback sound reconstituted by the earphone at a certain time at each handset that has requested this.

However, it appears that this callback sound signal is insufficient for certain users, as has been described above.

In accordance with the invention, a callback message, notably for signalling that the user has to start an action, for example, that he has to go to a certain appointment, can be assigned to each callback provided by the user.

The implementation of the invention implies various processes which will be described in detail and which are triggered from the handset. By activating these various processes, the user makes it possible to execute various operations.

First, FIG. 3 is referred to which is the first operation flow chart of the system according to the invention. Box K1 indicates the access to the local menu LOC_M of the handset. Based on a field of this menu, a request is made to establish a link called owner link, between the handset and the base station, which is indicated in box K5. This link obviously falls within the scope of the standards directing the DECT systems (see ETS300175-5, notably paragraph 7.7.4.5). But this link cannot always be established and box K1 is returned to. This is signalled to the user by a message DEN (box K8) and the local menu is returned to (box K1). This link, which has been established, makes it possible to access another menu REM_M indicated by box K9 coming from the base station BS. From this menu may be selected the menu "callback" AL_M indicated in box K11 of FIG. 4. On this menu, by acting on the keys 80 and 81, the callback may be used or deactivated in box K14. If the callback is used, then the make-callback-time menu TM_M is accessed, indicated in box K16. If the callback is deactivated, the menu is left at box K17.

The menu TM_M is explained in FIG. 5. By depressing the keys 80 and 81, the callback times are scrolled which will trigger the callback signal. The selection thereof is validated by depressing key 82. In FIG. 5 the validated time represented in grey is: 02 H. Then the minutes are set in the same manner. After the latter are validated, a message declaration menu Mes_Mg is proceeded to, explained in FIG. 6.

This menu asks whether one wishes to record a voice message or have this message typed which is shown in the boxes K30 and K31. Depending on the option chosen, one proceeds to box K85 or K86 entitled REC_MES TYP_ MES, respectively. The user finishes by validating either of these two options by depressing the validation key 82. If he wishes to record a message, he is connected to the message recording system which acts as a telephone answering machine. This is indicated in box K85 where, if he wishes his message to be typed, he has access to an editor so that the message can be typed. When one of these operations indicated in boxes K85 and K86 is terminated, the connection called owner connection between the handset and the base station is broken, box K90.

FIG. 7 explains the manner in which the data are arranged in the memory 24. These data are organized in the table of which each row relates to the various handsets whose number is six within the scope of the described example. Each of these six lines has a first field ST which, put in the "ON" state indicates that the handset is in the callback mode and that he thus wishes to be called back. A second field contains the time at which this callback is to be effected, a third field represented by an asterisk indicates the type of message one wishes to send to the callback subscriber: either a spoken message or a visualized message. If one does not want any message and one thus wishes a simple callback signal, it is thus sufficient to make an empty message. A fourth field relates to this message and the fifth field gives the reference of the respective handset.

Figure 8:
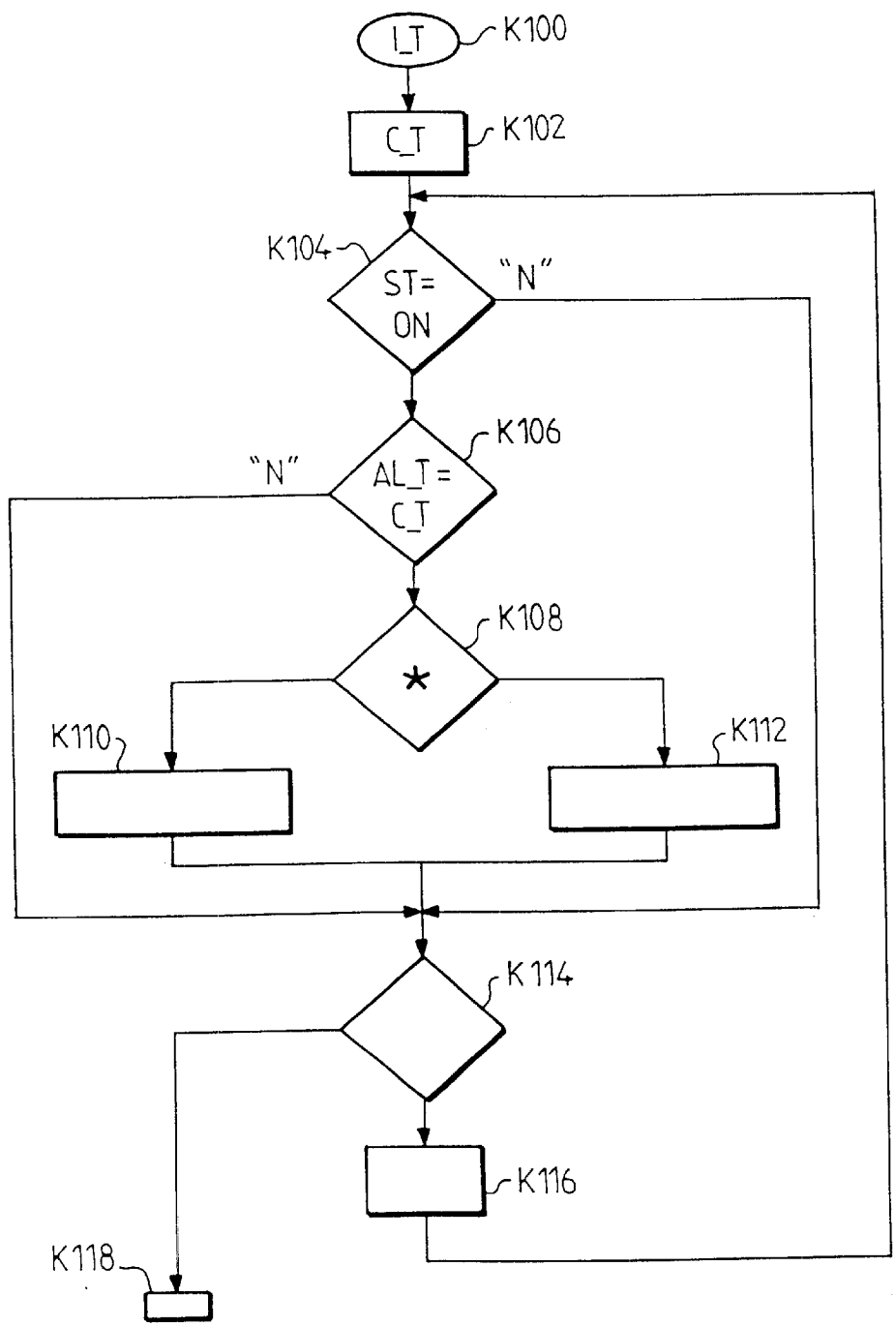

FIG. 8 shows a flow chart which helps to explain the operation of the system according to the invention for triggering a callback system to the handset(s).

The operation which will be explained is triggered by the signal I_T in box K100. The first operation, box K102, consists of stating the time called current time C_T based on the clock 31. Then the table explained in FIG. 7 is examined. First the data relating to the first handset HD1 are examined. First the field ST, box K104. If a callback signal has been requested, then the coincidence of the requested callback time AL_T and current time C_T is examined in box K106. If these times coincide, the type of the message to be transmitted is tested in box K108. If this is a sound message, one has to go through this procedure via the answering machine, which is indicated in box K110. If this is a visualized message, the screen 60 is proceeded with and the procedure is carried out in box K112. These procedures imply establishing owner links already mentioned above.

Subsequently, there is examined in box K114 whether the data relating to all the handsets have been analyzed well and if not, preparations are made to examine the following, box K116, and box K104 is returned to. If all the handsets have been examined, then the process is terminated, box K118.

If the tests indicated in box K104 and K106 turn out to be negative, box K114 is proceeded to.

What is claimed is:

1. A telephony system formed by a base station and at least one subscriber device intended for at least one user, the telephony system comprising a callback system for producing callback signals for said at least one user, wherein a message may be assigned to each callback signal, said message being a displayed text including a reason for said callback signal, and wherein said callback system includes a memory for storing data related to said callback signal; said data including a first field indicative of whether said callback signal should be sent to said at least one subscriber device, a second field which includes a time said callback signal is to be sent to said at least one subscriber device, a third field which includes said text, and a fourth field which includes an identification of said at least one subscriber device.

2. A telephony system as claimed in claim 1, characterized in that it satisfies the DECT standard.

3. A telephony system as claimed claim 1, characterized in that the messages are visualized messages.

4. A system as claimed claim 1, characterized in that said messages are empty messages.

5. A method implemented in a system as claimed in claim 1, recording a callback request comprises the following steps:
    establishing a link between the at least one subscriber device and the base station,
    choosing of a callback time for forming a first callback data,
    choosing between a spoken message or written message for forming a second callback data,
    recording of the message, and
    writing said callback data in a table addressed by the identification of the subscriber devices.

6. A method as claimed in claim 5, wherein effecting a callback the following steps:
    reading said table by carrying out this reading in succession for each of said subscriber devices,
    analyzing of said callback data,
    establishing a link to a respective subscriber device determined by said analysis,
    transmitting of a callback signal, and
    delivering of the message.

7. A subscriber device suitable for such a telephony system as claimed in claim 1, comprising means for writing said callback data in a table.

8. A base station suitable for such a telephony system as claimed in claim 1, comprising means for containing said table and managing this table and means for triggering the desired callbacks to the subscriber devices.

9. The telephony system of claim 1, wherein said reason had been typed using said at least one subscriber device during formation of said callback signal.

10. The telephony system of claim 1, wherein said reason had been typed using said at least one subscriber device for being displayed back on said at least one subscriber device.

11. The telephony system of claim 1, wherein said callback signal includes a sound recording recorded by said at least one user for playback.

12. The telephony system of claim 1, wherein said callback signal includes a sound recording of said reason.

13. The telephony system of claim 1, wherein said callback signal includes a sound recording of said reason recorded during formation of said callback signal.

14. A telephony system comprising:

a handset; and a base station which communicates with said handset;

wherein said telephony system is configured to allow a user of said handset to request a callback signal from said base station, said callback signal including a displayed text having a reason for said callback signal, and wherein said base station includes a memory for storing data related to said callback signal; said data including a first field indicative of whether said callback signal should be sent to said handset, a second field which includes a time said callback signal is to be sent to said handset, a third field which includes said text, and a fourth field which includes an identification of said handset.

15. The telephony system of claim 14, wherein said reason had been typed using said handset during formation of said callback signal.

16. The telephony system of claim 14, wherein said reason had been typed using said handset for being displayed back on said handset.

17. The telephony system of claim 14, wherein said callback signal includes a sound recording recorded by said user for being replayed.

18. The telephony system of claim 17, wherein said sound recording is recorded in said base station.

19. The telephony system of claim 14, wherein said callback signal includes a sound recording of said reason.

20. The telephony system of claim 14, wherein said callback signal includes a sound recording of said reason recorded during formation of said callback signal.

* * * * *